United States Patent
Huff et al.

(10) Patent No.: US 10,843,253 B2
(45) Date of Patent: Nov. 24, 2020

(54) ADAPTIVE CONTROL FOR SELF-PIERCING RIVET (SPR) INSERTION

(71) Applicant: Ford Global Technologies, LLC, Dearborn, MI (US)

(72) Inventors: Garret Huff, Ann Arbor, MI (US); Amanda Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 15/908,486

(22) Filed: Feb. 28, 2018

(65) Prior Publication Data

US 2019/0262893 A1 Aug. 29, 2019

(51) Int. Cl.
| | |
|---|---|
| *B21J 15/28* | (2006.01) |
| *B62D 65/02* | (2006.01) |
| *B21J 15/02* | (2006.01) |
| *B21J 15/10* | (2006.01) |
| *B21J 15/36* | (2006.01) |

(52) U.S. Cl.
CPC ............ *B21J 15/285* (2013.01); *B21J 15/02* (2013.01); *B21J 15/025* (2013.01); *B21J 15/10* (2013.01); *B21J 15/28* (2013.01); *B62D 65/02* (2013.01); *B21J 15/36* (2013.01); *Y10T 29/4978* (2015.01); *Y10T 29/49771* (2015.01); *Y10T 29/49776* (2015.01); *Y10T 29/49837* (2015.01); *Y10T 29/49943* (2015.01); *Y10T 29/49956* (2015.01); *Y10T 29/5343* (2015.01); *Y10T 29/5377* (2015.01)

(58) Field of Classification Search
CPC . B21J 15/02; B21J 15/025; B21J 15/10; B21J 15/28; B21J 15/285; B21J 15/36; B62D 65/02; Y10T 29/49771; Y10T 29/49776; Y10T 29/4978; Y10T 29/49943; Y10T 29/49956; Y10T 29/49837; Y10T 29/5343; Y10T 29/5377
See application file for complete search history.

(56) References Cited

U.S. PATENT DOCUMENTS

| | | | |
|---|---|---|---|
| 7,559,133 | B2 | 7/2009 | Chitty et al. |
| 7,599,133 | B2 * | 10/2009 | Nakai ............... B29D 11/0073 264/1.32 |
| 9,015,920 | B2 | 4/2015 | Mauer et al. |
| 9,027,220 | B2 * | 5/2015 | Schlafhauser ......... B21J 15/025 29/432 |

(Continued)

FOREIGN PATENT DOCUMENTS

CN 102717022 6/2016

OTHER PUBLICATIONS

Hoang, N.-H. et al., Self-piercing riveting connections using aluminium rivets, International Journal of Solids and Structures, 2010, vol. 47, pp. 427-439, Elsevier Ltd., available at URL www.elsevier.com/locate/ijsolstr.

*Primary Examiner* — Jermie E Cozart
(74) *Attorney, Agent, or Firm* — Burris Law, PLLC

(57) ABSTRACT

A method of installing a self-piercing rivet (SPR) is provided that includes providing an SPR installation tool with stack-up parameters prior to, during, and/or after insertion of the SPR into at least two adjacent workpieces, adjusting at least one insertion parameter of the SPR installation tool based on the stack-up parameters, and adaptively installing the SPR into the adjacent workpieces.

18 Claims, 3 Drawing Sheets

(56) References Cited

U.S. PATENT DOCUMENTS

| | | | |
|---|---|---|---|
| 2002/0029450 A1* | 3/2002 | Kondo | B21J 15/025 29/407.01 |
| 2012/0167366 A1* | 7/2012 | Mauer | B21J 15/025 29/407.08 |
| 2013/0263433 A1* | 10/2013 | Stoian | B21J 15/02 29/525.06 |
| 2014/0173869 A1* | 6/2014 | Bloecher | B23P 19/04 29/407.01 |
| 2014/0259600 A1* | 9/2014 | Kilibarda | G01N 21/9515 29/407.04 |

* cited by examiner

ADAPTIVE CONTROL FOR SELF-PIERCING RIVET (SPR) INSERTION

FIELD

The present disclosure relates generally to fastening, and more particularly to a self-pierce riveting system and a method for forming a riveted joint.

BACKGROUND

The statements in this section merely provide background information related to the present disclosure and may not constitute prior art.

Self-pierce riveting has become a popular technique to join two or more materials. In self-pierce riveting, a pre-punched hole is not required. The self-pierce riveting connection is achieved by using a rivet and a die. By placing the materials to be joined between the rivet and the die and by using a punch to press the rivet against the materials, the rivet pierces and deforms the materials, thereby forming a riveted joint.

Generally, a plurality of self-piercing rivets (SPRs) are used to join two or more workpieces together, or a plurality sets of workpieces are joined by SPRs, using the same installation tool. Due to various manufacturing tolerances of the length of the SPRs and thicknesses tolerances of the workpieces, some SPRs may be longer or shorter, and some workpieces may be thicker or thinner. If the SPRs are installed using the same punch displacement, the SPRs may penetrate into the workpieces to different degrees/depths. For example, some SPRs may over-penetrate and some rivets may under-penetrate into the workpieces, resulting in different joint strengths of the SPR joint.

The variability in joining workpieces by SPRs, among other issues related to the inconsistent installation of SPRs, is addressed by the present disclosure.

SUMMARY

In one form, a method of installing a self-piercing rivet (SPR) is provided, which includes providing an SPR installation tool with stack-up parameters prior to, during, and/or after insertion of the SPR into at least two adjacent workpieces, adjusting at least one insertion parameter of the SPR installation tool based on the stack-up parameters, and adaptively installing the SPR into the adjacent workpieces.

In other features, the method further includes evaluating the SPR that has been installed and adjusting at least one insertion parameter of the SPR installation tool again if the installed SPR is not acceptable. The stack-up parameters include, by way of example, pre- and in-situ measured and calculated values and respective tolerances of workpiece thicknesses, workpiece strengths and toughness, SPR length, SPR hardness, die depth, die profile of the SPR die, and adhesive presence, among others. The insertion parameters include, by way of example, net and relative displacement of an insertion tool, applied energy of the insertion tool, and applied force of the insertion tool among others. In one form, the stack-up parameters are based on a plurality of previously installed SPRs. In another form, the insertion parameters are selected based on a statistical range having a predetermined process capability index (CpK). Further, the stack-up parameters may be collected and stored in a remote database. The SPR installation tool can then be provided with the stack-up parameters wirelessly from the remote database.

The method may further include providing a graphical user interface (GUI). The GUI resides on a device such as, by way of example, a smart phone, a tablet, a laptop, or a personal computer. Additionally, the stack-up parameters may be collected from a plurality of geographically separated installation sites from different installation tools.

In another form, an apparatus for installing an SPR into a plurality of workpieces is provided, which includes an SPR installation tool, a microprocessor, and a controller. The microprocessor is in communication with the SPR installation tool and is configured to store, receive, and send stack-up parameters prior to, during, and/or after insertion of the SPR into the workpieces to the SPR installation tool. The controller is in communication with the microprocessor and the SPR installation tool. The controller adjusts at least one insertion parameter of the SPR installation tool based on the stack-up parameters such that the SPR can be adaptively installed into the workpieces.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
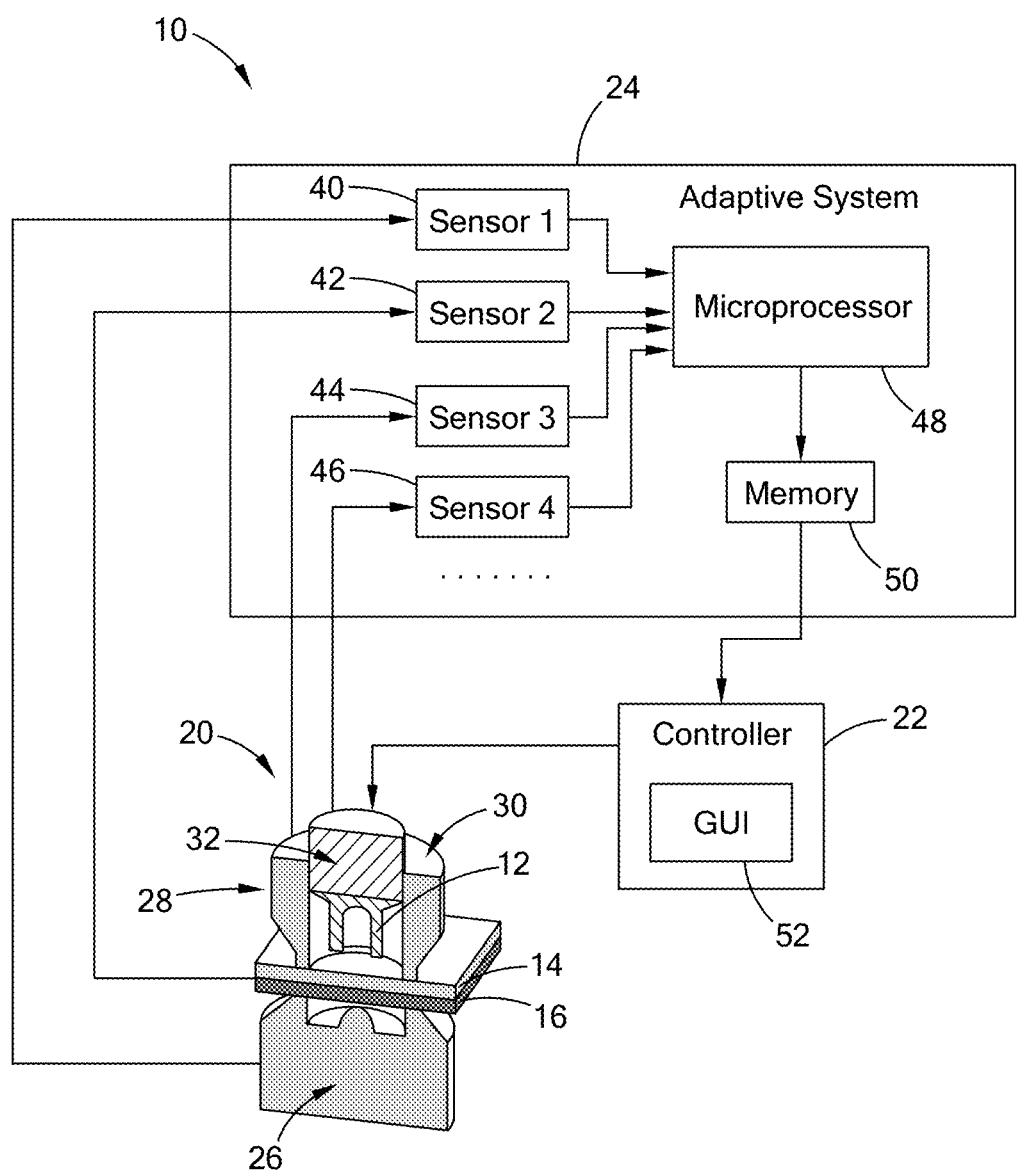
FIG. 1 is a schematic view of a riveting system constructed in accordance with the teachings of the present disclosure.

Referring to FIG. 1, a riveting system 10 for installing a self-piercing rivet (SPR) 12 to join two or more workpieces 14, 16 according to the present disclosure includes an SPR installation tool 20 for installing the SPR 12, a controller 22 for controlling an operation of the SPR installation tool 20, and an adaptive system 24 for adapting the installation tool 20 for a particular SPR 12 and/or a particular combination of workpieces 14, 16, taking into consideration of manufacturing tolerances of the SPR 12 and the workpieces 14, 16.

The installation tool 20 includes a die 26 and a punch assembly 28 for receiving the SPR 12 and pressing the SPR 12 into the workpieces 14, 16. The punch assembly 28 includes a punch holder 30 and a punch 32 movably received within the punch holder 30. The SPR 12 is received within the punch holder 30 during installation. The controller 22 controls the displacement of the punch 32 toward/away from the die 26 during/after installation of the SPR 12 and the force exerted by the punch 32 on the SPR 12.

Figure 2:
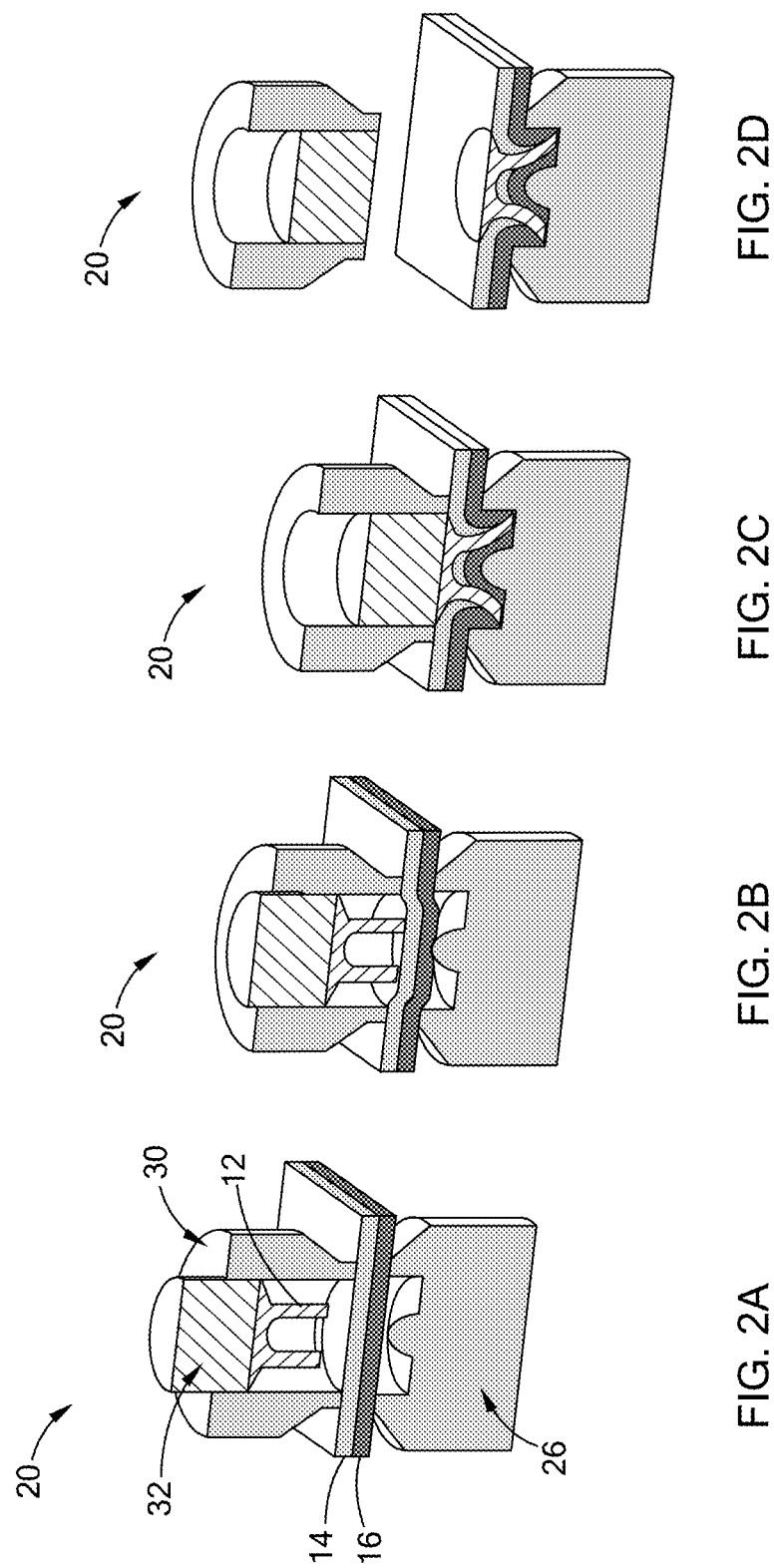
FIG. 2A-2D are partial perspective cross-sectional views depicting various stages of installing a self-piercing rivet into workpieces in accordance with the methods of the present disclosure.

Referring to FIG. 2A to 2D, to install the SPR 12, workpieces 14, 16 to be joined are disposed between the punch holder 30 and the die 26 as shown in FIG. 2A. The punch holder 30 and the die 26 jointly form a clamp to sandwich the workpieces 14, 16 therebetween. As an example, the punch holder 30 and the die 26 may be formed at opposing ends of a C-clamp (not shown). The SPR 12 is received in the punch holder 30.

Referring to FIG. 2B, when the workpieces 14, 16 are properly in place, the punch 32 is actuated to press the SPR 12 against the workpieces 14, 16. The workpieces 14, 16 are slightly deformed at this stage.

Referring to FIG. 2C, as the punch 32 continues to press the SPR 12 against the workpieces 14, 16, the insertion end of the SPR 12 completely penetrates the upper workpiece 14 and then partially penetrate into the lower workpiece 16 to create a mechanical interlock. Concurrently, the workpieces 14, 16 and the SPR 12 are deformed into a closing end in the die 26. The closing end forms a riveted head.

Referring to FIG. 2D, after the SPR 12 is installed in the workpieces 14, 16, the punch 32 is moved away from the workpieces 14, 16 to complete installation of the SPR 12. The joined assembly may be used to form a vehicle body and closure parts in automobiles or in any applications which require joining of two or more layers of materials.

Referring back to FIG. 1, the adaptive system 16 includes a plurality of sensors 40, 42, 44, 46, a microprocessor 48, and a memory 50. The adaptive system 16 is in communication with the controller 22 and the SPR installation tool 20 to provide stack-up parameters to the controller 12 to assist in operation of the SPR installation tool 20, taking into consideration the manufacturing/assembly tolerance of the SPR 12 and the workpieces 14, 16.

Generally, to join two or more workpieces together, a plurality of SPRs 12 are required to be installed in the workpieces. The plurality of SPRs 12 may have varied length due to manufacturing tolerance.

When a longer rivet is being inserted, the SPR 12 may penetrate deeper into the stack of workpieces 14, 16 under the same operation of the punch 32. The SPR 12 may penetrate through the lower workpiece 16, resulting in the insertion end of the SPR 12 protruding from the riveted head. In contrast, when a shorter SPR 12 is being inserted, the SPR 12 may not sufficiently penetrate into the workpieces 14, 16 under the same operation of the punch. As a result, a desired interlocking between between the workpieces 14, 16 and the SPR 12 cannot be achieved.

Similarly, the installation tool 20 may be used to install a plurality of SPRs 12 into a plurality sets of workpieces 14, 16. Some sets of workpieces 14, 16 may be thicker or thinner than another sets of workpieces 14, 16, resulting in different degrees of SPR penetration.

Moreover, the deformation of the SPR 12 and the workpieces 14, 16 and the interlocking between the SPR and the workpieces 14, 16 depend on the material property of the SPR 12 and the workpieces 14, 16. Therefore, the material property of the SPR 12 and the workpieces 14 16, the size of SPR 12, the thickness of the workpieces 14, 16 affect the robustness and quality of the riveted joints of the joined assemblies.

To prevent the SPR 12 from penetrating through the lower workpiece 16, the punch 32 of the installation tool 20 may be adjusted to have a shorter displacement when a longer rivet is being inserted or when a thickness of the workpieces is smaller. Similarly, the punch 32 of the installation tool 20 may be adjusted to have a longer displacement when a shorter rivet is being inserted or when a thickness of the workpieces is larger to ensure sufficient interlocking between the SPR 12 and the workpieces 14, 16. The adaptive system 24 allows the controller 22 to adjust the settings of the SPR installation tool 20 to make accommodations for the tolerance variations in order to improve quality and robustness of the riveted joints.

The plurality of sensors 40, 42, 44, 46 are disposed at the SPR installation tool 20 and the workpieces 14, 16 for sensing and monitoring the operating conditions of the installation tool 20, the conditions of the workpieces 14, 16 and the conditions of the SPR prior to, during, and after installation of the SPR 12. The operating conditions of the installation tool 20 include the force/energy applied by the punch 32 and the displacement of the punch 32. The conditions of the workpieces 14, 16 include the thickness of the workpieces 14, 16, the strength of the workpieces 14, 16, and presence of additional joint materials, such as an adhesive or corrosion barrier. The conditions of the SPR 12 include the length of the SPR and the material strength of the SPR. The quality of the installed SPR is also sensed and monitored by monitoring the head of the riveted joint.

The plurality of sensors 40, 42, 44, 46 may include a position sensor, a thickness sensor, a height sensor, and a local cell. The position sensor may be used to measure the initial position and final position of the punch 32, which can be used to determine the displacement of the punch 32. The thickness sensor may be used to measure the thickness of the workpieces 14, 16. The height sensor is used to measure the height of the head of the riveted joint. The load cell may be used to measure the force/energy applied on the SPR 12 by the punch 32 during insertion of the SPR 12. The load cell may also be used to measure the rivet length prior to and after the installation of the SPR 12.

The sensors 40, 42, 44, 46 send signals corresponding to the various measurements to the microprocessor 48. The microprocessor 48 is configured to store, receive, and send stack-up parameters to the controller 22 prior to, during, and/or after insertion of the SPR 12 into the workpieces 14, 16. The microprocessor 48 calculates and determines the stack-up parameters and stores the stack-up parameters in a memory 50 or a remote database. The controller 22 may be provided with the stack-up parameters wirelessly from the memory 50 or the remote database. The stack-up parameters may include pre- and in-situ measured and calculated values and respective tolerances of workpiece thicknesses, workpiece strengths, SPR length, SPR strength, die depth, die profile of the SPR die, and adhesive presence.

To obtain the stack-up parameters, several trial installation processes may be performed so that the plurality of sensors 40, 42, 44, 46 may obtain measurements of certain parameters prior to, during, and after the trial installation process. The measurements are sent to the microprocessor 48 for process and analysis in order to obtain an optimum installation result. Therefore, through the trial installation process, the adaptive system 24 allows the controller 22 to control the installation tool 20 to apply the punch with a predetermined displacement and force/energy suitable for the particular SPR 12 and the particular set of workpieces 14, 16 for an optimum result, taking the manufacturing tolerances of the SPR 12 and the workpieces 14, 16 into account.

The controller 22 is in communication with the microprocessor 48 and SPR installation tool 20 for controlling the operation of the SPR installation tool 20 based on the stack-up parameters. The controller 22 then set up the installation tool 20 based on the parameters obtained during the trial processes for an optimum riveting result. The controller 22 may adjust one or more insertion parameters of the SPR installation tool 20 based on the stack-up parameters such that the SPR 12 can be adaptively installed into the workpieces 14, 16. The insertion parameters include, but are not limited to, net and relative displacement of an insertion tool, applied energy of the insertion tool, and applied force of the insertion tool. After the setting up of the installation tool, the SPR is installed based on the acquired stack-up parameters and the insertion parameters.

During installation of the SPR 12, the various parameters are continuously obtained to provide a feedback to the controller 22, so that the controller 22 can control the installation tool 20 in a closed-loop manner, thereby achieving real time control of the process through sensed values. The feedback loop also monitors and tracks the installed rivet head height, thereby eliminating the need for a post-insertion checks.

The controller 22 may be a smart phone, a tablet, a laptop, and a personal computer. Alternatively, the adaptive system 24 may be integrated into the controller 22 to assist in monitoring and storing signals from the various sensors 40, 42, 44, 46. Optionally, the riveting system 10 may include a graphical user interface (GUI) 52, which may be a separate component from the controller 22 and in communication with the controller 22, or which may reside within the controller 22.

Figure 3:
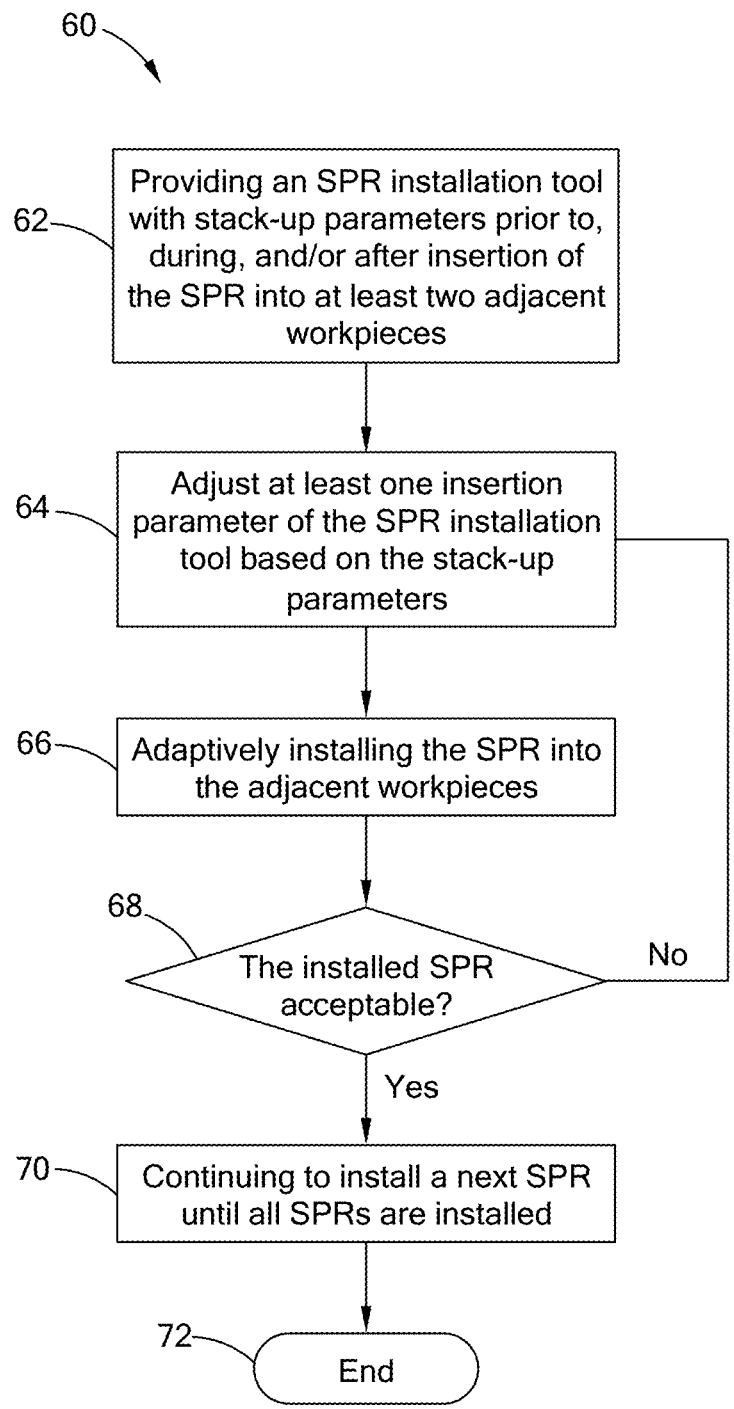
FIG. 3 is a flow diagram of a method of adaptively installing a self-piercing rivet into workpieces in accordance with the teachings of the present disclosure.

Referring to FIG. 3, a method 60 of installing a self piercing rivet (SPR) starts with providing an SPR installation tool with stack-up parameters prior to, during, and/or after insertion of the SPR into at least two adjacent workpieces in step 62. The stack-up parameters are selected from the group consisting of pre- and in-situ measured and calculated values and respective tolerances of workpiece thicknesses, workpiece strengths, SPR length, SPR strength, die depth, die profile of the SPR die, and adhesive presence. The stack-up parameters may be obtained by performing a plurality of trial installation at a plurality of installation sites.

A plurality of sensors 40, 42, 44, 46 sense or measure a plurality of parameters and send a plurality of parameters to a microprocessor 48. The microprocessor 48 collect, process and calculate these parameters. The parameters are then sent to a memory 50 or a remote database, which stores the parameters as stack-up parameters. The SPR installation tool 20 is provided with the stack-up parameters wirelessly from the memory 50 or the remote database in step 70.

Next, at least one insertion parameter of the SPR installation tool is adjusted based on the stack-up parameters in step 64. The insertion parameter is selected from the group consisting of net and relative displacement of an insertion tool, applied energy of the insertion tool, and applied force of the insertion tool. The insertion parameters are selected based on a statistical range having a predetermined Cpk. As part of the installation tool set-up, the installation tool may try minor input changes and monitor the output and observed tolerances and results. Based on a desired final result, the installation tool can self-center parameters within a range to deliver the desired outcome.

After the installation tool set up, the SPR is adaptively installed into adjacent workpieces in step 66. After the SPR is installed, the installed SPR is evaluated in step 68. The evaluation may be performed by measuring the height/size of the head of the riveted joint. If the installed SPR is not acceptable, the method goes back to step 64 to adjust the at least one insertion parameter of the SPR installation tool again. If the installed SPR is acceptable, the SPR installation tool continues to install the next SPR until all the SPRs are installed in step 70.

During and after installation of the SPR, the various parameters are continuously obtained by the sensors and sent to the microprocessor, which then send the parameters to the memory 50 or the remote database to update the stack-up parameters. The memory 50 or the remote database sends a feedback to the controller so that the controller controls the installation tool in a closed-loop manner, thereby achieving real time control of the process through sensed values. The method ends in step 72.

Therefore, by utilizing one or more known variables generated before, during, and/or after the rivet insertion, the controller can set up the installation tool and tune the insertion parameters to adapt for new SPR or workpieces taking into consideration the manufacturing/assembly tolerance. As a result, the SPR is adaptively installed, and the riveted joints can have improved quality, stability, and robustness of the riveted joints.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of installing a self piercing rivet (SPR) comprising:
   providing an SPR installation tool with stack-up parameters prior to, during, and/or after insertion of the SPR into at least two adjacent workpieces, wherein the stack-up parameters are selected from the group consisting of pre- and in-situ measured and calculated values and respective tolerances of workpiece thicknesses, workpiece strengths, SPR length, SPR strength, die depth, die profile of the SPR die, and adhesive presence;
   adjusting at least one insertion parameter of the SPR installation tool based on the stack-up parameters; and
   adaptively installing the SPR into the adjacent workpieces based on the adjusting of the at least one insertion parameter of the SPR installation tool.

2. The method according to claim 1, further comprising evaluating the SPR that has been installed and adjusting the at least one insertion parameter of the SPR installation tool again if the installed SPR is not acceptable.

3. The method according to claim 1, wherein the at least one insertion parameter is selected from the group consisting of net and relative displacement of an insertion tool, applied energy of the insertion tool, and applied force of the insertion tool.

4. The method according to claim 1, wherein the stack-up parameters are based on a plurality of previously installed SPRs.

5. The method according to claim 1, wherein the at least one insertion parameter is selected based on a statistical range having a predetermined process capability index (Cpk).

6. The method according to claim 1, wherein the stack-up parameters are collected and stored in a remote database.

7. The method according to claim 6, wherein the SPR installation tool is provided with the stack-up parameters wirelessly from the remote database.

8. The method according to claim 6 further comprising providing a graphical user interface (GUI).

9. The method according to claim 8, wherein the GUI resides on a device selected from the group consisting of a smart phone, a tablet, a laptop, and a personal computer.

10. The method according to claim 1, wherein the stack-up parameters are collected from a plurality of installation sites.

11. A method of assembling a vehicle body, the method comprising:
   providing a self piercing rivet (SPR) installation tool with stack-up parameters prior to, during, and/or after insertion of the SPR into at least two adjacent workpieces, wherein the stack-up parameters are selected from the group consisting of pre- and in-situ measured and calculated values and respective tolerances of workpiece thicknesses, workpiece strengths, SPR length, SPR strength, die depth, die profile of the SPR die, and adhesive presence;
   adjusting at least one insertion parameter of the SPR installation tool based on the stack-up parameters; and
   adaptively installing the SPR into the adjacent workpieces such that the vehicle body is assembled based on the adjusting of the at least one insertion parameter of the SPR installation tool.

12. An apparatus for installing a self-piercing rivet (SPR) into a plurality of workpieces comprising:
   an SPR installation tool; and
   a microprocessor in communication with the SPR installation tool and configured to store, receive, and send stack-up parameters prior to, during, and/or after insertion of the SPR into the workpieces to the SPR installation tool, wherein the stack-up parameters are selected from the group consisting of pre- and in-situ measured and calculated values and respective tolerances of workpiece thicknesses, workpiece strengths, SPR length, SPR strength, die depth, die profile of the SPR die, and adhesive presence;
   a controller in communication with the microprocessor and the SPR installation tool,
   wherein the controller adjusts at least one insertion parameter of the SPR installation tool based on the stack-up parameters such that the SPR can be adaptively installed into the workpieces based on the adjusting of the at least one insertion parameter of the SPR installation tool by the controller.

13. The apparatus according to claim 12, wherein the stack-up parameters are stored in a database.

14. The apparatus according to claim 13, wherein the database is remote from the SPR installation tool.

15. The apparatus according to claim 14, wherein the SPR installation tool is provided with the stack-up parameters wirelessly from the remote database.

16. The apparatus according to claim 12, wherein the insertion parameter is selected from the group consisting of net and relative displacement of an insertion tool, applied energy of the insertion tool, and applied force of the insertion tool.

17. The apparatus according to claim 12, further comprising a graphical user interface (GUI) in communication with the controller.

18. The apparatus according to claim 17, wherein the GUI resides within the controller.

* * * * *